(12) United States Patent
Denk et al.

(10) Patent No.: US 7,334,628 B2
(45) Date of Patent: Feb. 26, 2008

(54) FLOW CONTROL DEVICE FOR GAS STREAM

(75) Inventors: Walter Denk, Ditzingen (DE); Karl Lochmahr, Vaihingen (DE); Eric Reinisch, Weinheim (DE); Klaus Waibel, Kornwestheim (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/860,022

(22) Filed: May 18, 2001

(65) Prior Publication Data

US 2002/0000307 A1    Jan. 3, 2002

(30) Foreign Application Priority Data

May 18, 2000    (DE)    ................ 100 24 692

(51) Int. Cl.
*B60H 3/00*    (2006.01)
*B60H 1/02*    (2006.01)
*B60H 1/22*    (2006.01)
*B61D 27/00*    (2006.01)

(52) U.S. Cl. ................ 165/42; 165/96; 454/69; 454/327; 251/308

(58) Field of Classification Search ............. 165/41, 165/42, 96; 454/69, 327; 251/308, 305, 251/306, 129.11; D23/244; 110/163; 126/285 R
See application file for complete search history.

(56) References Cited

U.S. PATENT DOCUMENTS

| | | | | |
|---|---|---|---|---|
| 356,169 | A | * | 1/1887 | Smith |
| 1,230,882 | A | * | 6/1917 | Filbey |
| 1,402,824 | A | * | 1/1922 | Wood |
| 1,443,000 | A | * | 1/1923 | Briggs |
| 1,603,455 | A | * | 10/1926 | Dow |
| 2,106,093 | A | * | 1/1938 | Goese |
| 2,134,844 | A | * | 11/1938 | Schartow |
| 2,936,778 | A | * | 5/1960 | Stillwagon ............ 251/306 |
| 3,020,025 | A | * | 2/1962 | O'Mara ............ 165/96 X |
| 3,528,448 | A | * | 9/1970 | Urban |
| 3,539,148 | A | * | 11/1970 | Boos, Jr. |
| 3,750,698 | A | * | 8/1973 | Walchle et al. |
| 3,913,610 | A | * | 10/1975 | Paptzun |
| 4,176,823 | A | * | 12/1979 | Gliatas ............ 251/308 |

(Continued)

FOREIGN PATENT DOCUMENTS

DE    89 14 949.1    3/1990

(Continued)

OTHER PUBLICATIONS

The Free Dictionary by FARLEX, http://www.thefreedictionary.com/motor.*

*Primary Examiner*—Ljiljana Ciric
(74) *Attorney, Agent, or Firm*—Foley & Lardner LLP

(57) ABSTRACT

A control device for gas is provided with a pivotable flap mounted between side walls of a guide duct. A receiving pocket for the insertion of a drive element (motor) is provided on one of the side walls and is oriented in such a way that, after insertion, the output shaft of the drive element is in engagement with the flap. This receiving pocket may be arranged so that the drive element is inserted coaxially with respect to the pivot axis of the flap or transversely thereto, or if the receiving pocket extends into the interior of the duct, the pivot flap is provided with a corresponding cut-out.

22 Claims, 6 Drawing Sheets

U.S. PATENT DOCUMENTS

| | | | |
|---|---|---|---|
| 4,225,114 A * | 9/1980 | Barthelemy et al. | |
| 4,313,592 A * | 2/1982 | Baas | 251/305 |
| 4,325,536 A * | 4/1982 | Garrett | |
| 4,503,755 A * | 3/1985 | Nordquist et al. | |
| 4,513,771 A * | 4/1985 | Thomas et al. | |
| 4,534,538 A * | 8/1985 | Buckley et al. | 251/306 |
| 4,962,783 A * | 10/1990 | Ball et al. | 251/305 |
| 5,067,506 A * | 11/1991 | Ball et al. | 251/305 |
| 5,125,624 A * | 6/1992 | Yohner | 251/308 |
| 5,160,115 A | 11/1992 | Ito et al. | |
| 5,195,719 A * | 3/1993 | Ball et al. | |
| 5,356,116 A * | 10/1994 | Morgan et al. | 251/308 |
| 5,370,361 A * | 12/1994 | Mendell et al. | |
| 5,374,032 A * | 12/1994 | Pearson et al. | |
| 5,593,131 A * | 1/1997 | Briggs et al. | 251/305 |
| 5,630,571 A * | 5/1997 | Kipp et al. | 251/308 X |
| 5,666,988 A * | 9/1997 | Becker | 251/308 X |
| 5,878,806 A | 3/1999 | Denk et al. | 165/42 |
| 6,035,849 A * | 3/2000 | Bluestone | 126/285 R |
| 6,047,951 A * | 4/2000 | Ito et al. | 251/308 |
| 6,206,024 B1 * | 3/2001 | Naberhaus | 251/308 X |
| 6,209,850 B1 * | 4/2001 | Rafalski | 251/308 |
| 6,263,898 B1 * | 7/2001 | Vanderveen et al. | 251/308 X |
| 6,273,119 B1 * | 8/2001 | Foster et al. | 251/308 X |
| 6,286,810 B1 * | 9/2001 | Dole et al. | 251/308 X |
| 6,412,752 B1 * | 7/2002 | Daly et al. | 251/129.11 |
| 6,419,206 B1 * | 7/2002 | Wakamatu et al. | 251/308 |
| 6,497,245 B1 * | 12/2002 | Torii | 251/306 |
| 6,802,768 B2 * | 10/2004 | Stevenson et al. | 251/129.11 |

FOREIGN PATENT DOCUMENTS

| | | |
|---|---|---|
| DE | 36 42 489 | 6/1991 |
| DE | 44 42 000 | 5/1996 |
| DE | 196 20 749 | 11/1997 |
| DE | 100 04 795 C1 | 5/2001 |
| FR | 2 741 689 A1 | 5/1997 |

* cited by examiner

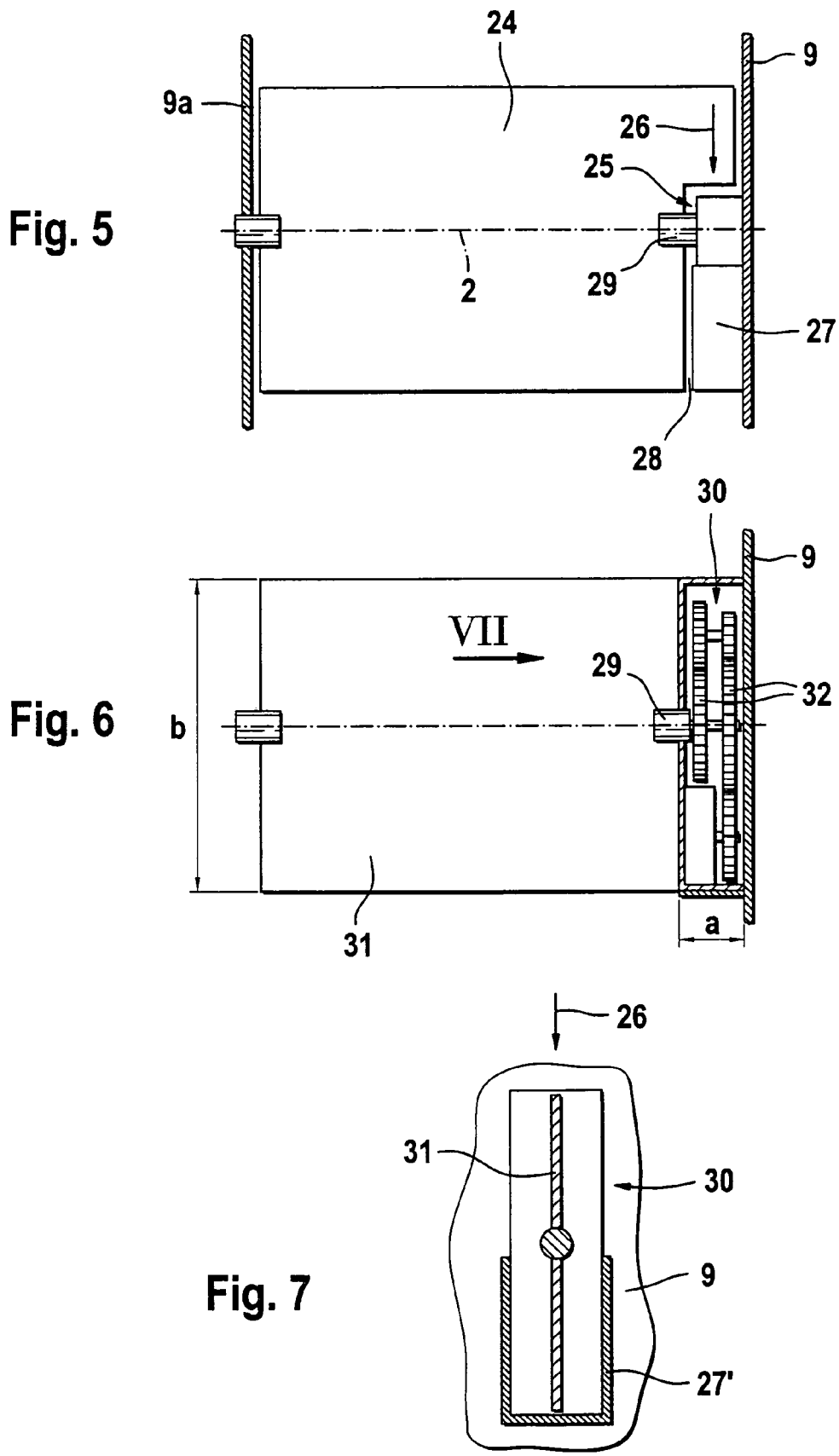

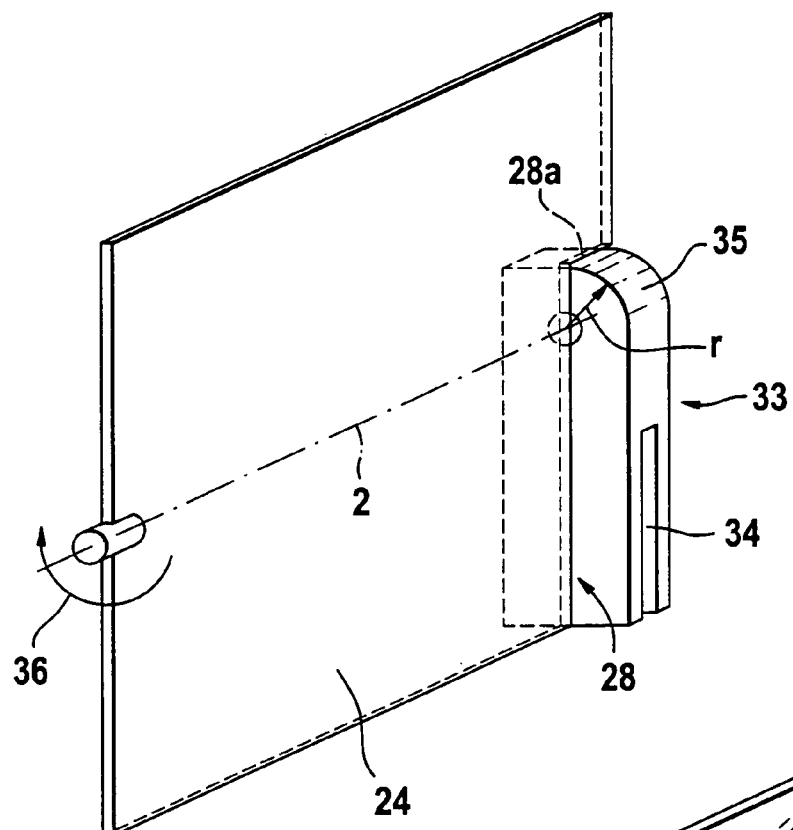
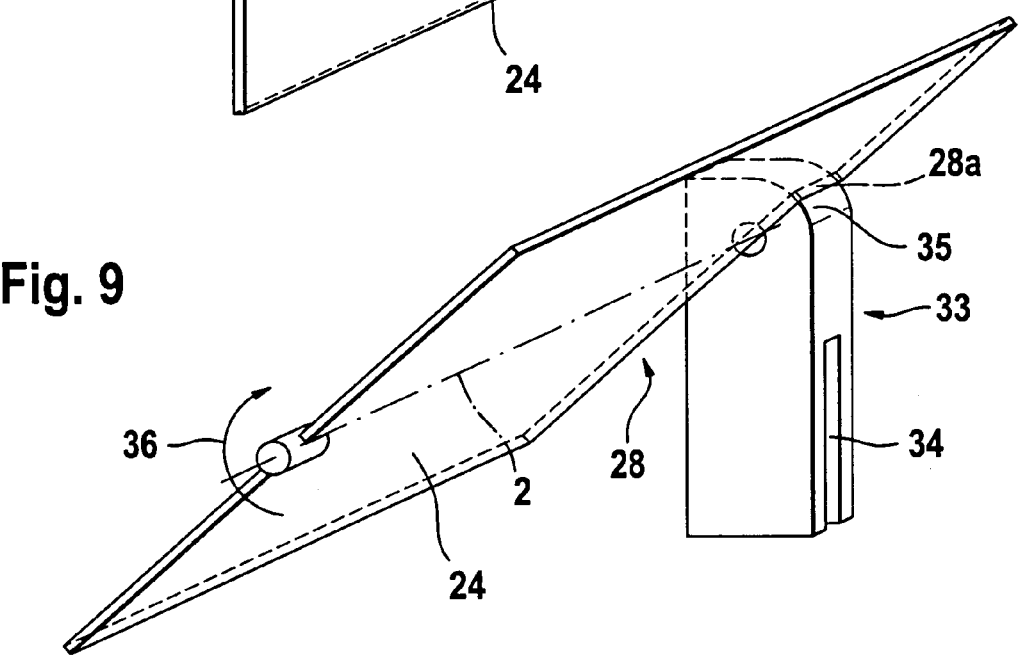
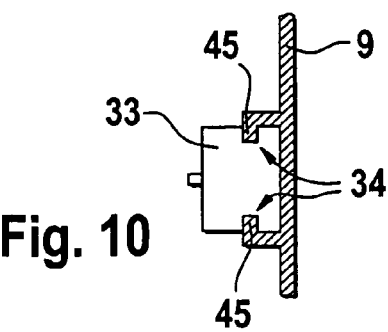
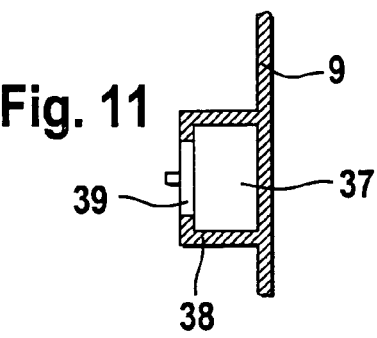

FLOW CONTROL DEVICE FOR GAS STREAM

BACKGROUND OF THE INVENTION

The invention relates generally to a flow control device for gas streams, and more specifically to a flow control device for air streams which are guided in ducts in motor-vehicle heating or air-conditioning systems.

German Patent Publication DE 44 42 000 A1 discloses a heating and/or air-conditioning device. FIGS. 3 to 5 of this document show a control device wherein one of the bearing journals of a flap extends through the side wall of a support frame, where it is provided with a pinion that meshes with a corresponding pinion of a drive motor. The remaining flaps provided in this arrangement are connected to the first flap by way of coupling rods, only the first flap being driven in the exemplary embodiment shown in those figures.

However, this arrangement suffers from the drawback that with a construction of this type, the drive motor must be mounted on the outside of the side wall of the support frame in such a way that its output shaft or the pinion resting on this shaft meshes with the pinion of the flap. Therefore, this installation of the drive motor requires certain adaptations to be made, and is complex and therefore time and effort consuming.

SUMMARY OF THE INVENTION

One object of the present invention is directed to providing a control device of the type described above but wherein the installation of a drive motor is significantly simplified.

Another object of the invention is to provide an improved automotive heating/air-conditioning system embodying improved air flow control means.

In accomplishing these objects, there has been provided according to one aspect of the present invention a device for gas flow control adapted for disposition in a duct of motor-vehicle heating or air-conditioning system, which comprises: a flap which is adapted to be pivotably supported between side walls of the duct; a drive element adapted for operative connection to the flap; and a receiving pocket for insertion of the drive element, the receiving pocket being provided in fixed relation to one of the side walls, and oriented and dimensioned such that the output shaft of the drive element is in engagement with the flap after insertion of the drive element in the receiving pocket. Preferably, the device includes a frame which is adapted to be installed in the duct and in which the receiving pocket is formed. This frame is capable of supporting other flaps which can be connected to the driven one by linkages.

According to a second aspect of the invention, there is provided a device for gas flow control which is adapted for disposition in a duct, which comprises: a flap pivotal about an axis, the flap having an operative position with the duct in which it is adapted to be disposed and wherein the axis is located in a predetermined location with respect to the operative position; a drive element having an output shaft; and a receiving pocket into which the drive element can be slid, the receiving pocket being sized and dimensioned so that it positions the drive element with respect to the flap so that at least one of a drive connection between the output shaft and the flap is established or the axis of rotation is located in the predetermined location, when the drive element is slid to a seated position in the receiving pocket.

According to another aspect of the invention, there is provided a motor vehicle air-conditioning system, comprising a housing defining an air flow duct, an evaporator located in the housing, a heater located in the housing and an air flow control device positioned in the air flow duct, wherein the air flow control device comprises a device as described above.

Further objects, features and advantages of the present invention will become more clearly appreciated as a description of the preferred embodiments is given with reference to the appended drawings.

BRIEF DESCRIPTION OF THE DRAWINGS

In the drawings:

FIG. 5 shows a further exemplary embodiment of the invention, in which the plug-in guide lies at right angles to the axis of the flap;

FIG. 6 shows a similar illustration to that shown in FIG. 5, but with a drive including a transmission whose length—as seen in the plug-in direction—approximately corresponds to the width of the control flap;

FIG. 7 is a sectional view of the device shown in FIG. 6, as seen in the direction of arrow VII;

FIG. 8 is a perspective view showing, in a first flap position, a variant of the embodiment shown in FIG. 5 with a drive housing which is adapted to be held by means of grooves on the side wall;

FIG. 9 is a perspective view showing the embodiment shown in FIG. 8 with a slightly pivoted flap;

FIG. 10 is a sectional view showing one possible way of attaching the drive element shown in FIG. 8;

FIG. 11 is a sectional view similar to that shown in FIG. 10, but showing a different plug-in guide embodiment;

DETAILED DESCRIPTION OF THE PREFERRED EMBODIMENTS

According to the invention a receiving pocket is provided on a side wall into which the drive element can be inserted. This receiving pocket is oriented and designed in such a way that the output shaft of the drive element is placed in engagement with the flap after the insertion.

This design allows for simplified installation of the drive and the omission of complicated orientation steps. The drive simply has to be pushed into the dedicated receiving pocket until it reaches its limit position. Upon reaching this position, the output shaft of the drive is operatively connected to the associated flap.

In one embodiment of the invention, the receiving pocket has a passage for the output shaft, but is otherwise closed. The receiving pocket may in a first embodiment be designed as a plug-in guide for the drive element, which guide runs coaxially with respect to the pivot axis of the flap while, in a further configuration of the invention, can be open on that side of the side wall which is remote from the flap. This enables the drive element to be easily introduced into the associated plug-in opening from the outside even after the flaps have been installed. Additionally, there is no need to dismantle parts which have already been assembled.

In another embodiment of the invention, the plug-in guide may be provided on the inner side of the side wall, in which case the flap may be provided with a corresponding recess which creates space for the plug-in guide to be provided. However, the plug-in guide may alternatively be provided on the outer side of the side wall, so that a cutout of this type in the flap is unnecessary, and the side wall, in particular an installation frame which has been provided with the side wall, has the plug-in guide projecting outwardly.

The plug-in guide may be of cylindrical design and may be provided with a coaxial bore on the closed side for the output shaft of the drive element to pass through. In this embodiment, a simple coaxial arrangement of the drive element and the flap is achieved.

However, it is also possible for the receiving pocket to be designed as a plug-in guide for the drive element which runs transversely to the pivot axis of the flap, and in this case must have an output shaft which projects toward the flap. In this case also, a receiving pocket of this type may be provided on that side of the side wall which faces inward toward the pivoting flap. The pivoting flap is provided with a cutout which leaves space for a pivoting movement past the drive element.

Additionally, it is also possible for this receiving pocket to be arranged on that side of the side wall which is remote from the pivoting flap, i.e., on the outside, in which case a passage opening for the output shaft needs to be provided in the side wall.

Figure 1:
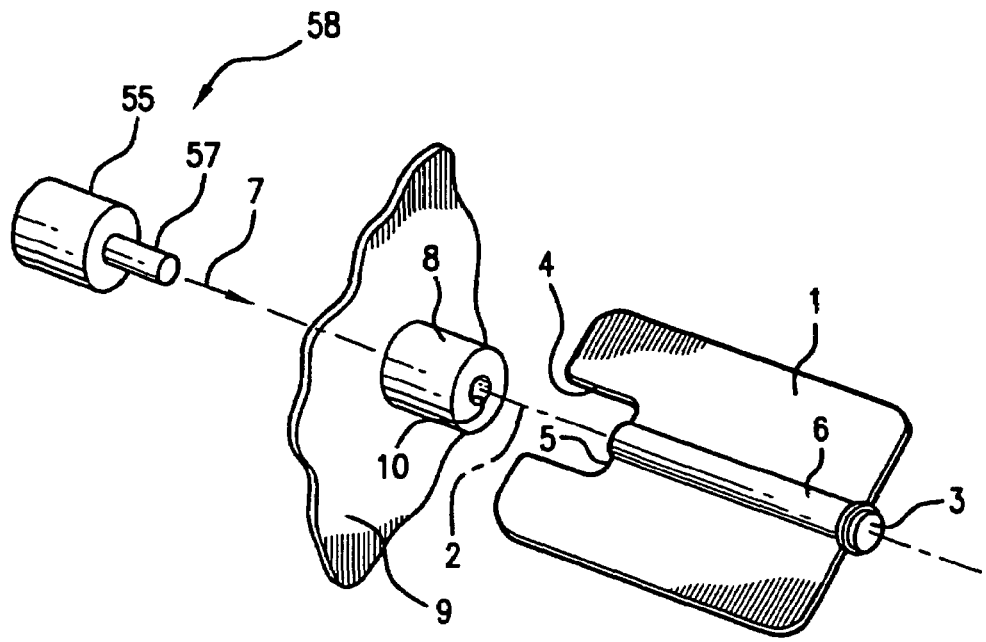
FIG. 1 shows, in an exploded perspective view, a first exemplary embodiment of a control device according to the invention, which has a cylindrical plug-in guide, which is oriented in the direction of the pivot axis of a control flap, for a drive element (not shown), which guide is provided on the inner side of a bearing wall for the flap.

FIG. 1 shows that a flap 1 is provided with a pivot axis 2 which is arranged in its longitudinal center. This flap 1 is arranged in a flow duct, which is not shown in detail since it is not directly connected with the invention. This flap 1 is adapted in such a way that in one of its pivotal positions it completely closes off the passage cross section of the duct, either on its own or together with other similar flaps. In a further limit position, which is pivoted through 90° with respect to the limit position just mentioned, the flap lies approximately parallel to the axis of the channel and therefore opens up the cross section of flow.

On one of its end sides, the flap is provided with a projecting bearing journal 3 and is mounted pivotably by means of this pin in the duct wall, which is not shown. It has an approximately rectangular recess or cut-out 4 on the second end side, which is open toward the end side and on the other side is delimited by a rim 5 with which the open end of a sleeve piece 6, which is arranged coaxially with respect to the pivot axis 2 and also serves to accommodate the bearing journal 3, is aligned. The open end of the sleeve piece 6, which is not visible, serves to receive an output shaft of a drive element, for example an electric motor, which is guided in alignment with the pivot axis 2 and is received in the sleeve 6 in a manner which establishes a drive connection therebetween. For this purpose, the output shaft may, at its end, be of a form which differs from a body of revolution.

The drive element 58, including drive motor 55 and shaft 57 is in this case introduced into a receiving pocket 8 in the direction of arrow 7. As shown, the pocket 8 projects from the inner side of the side wall 9 into the duct cross section and may be part of the side wall 9. The recess or cut-out 4 is dimensioned in such a way that it is slightly larger than the external diameter of the cylindrical receiving pocket 8. Therefore, if the drive element 58 is introduced into the open side of the receiving pocket 8 in the direction of the arrow 7—as shown on the basis of a different exemplary embodiment with reference to FIG. 2—the output shaft 57, which protrudes coaxially from the drive element 58, penetrates through the bore 10, which serves as a passage, and, when the recess 4 in the flap is located about the receiving pocket 8, can be pushed in a rotationally fixed manner into the sleeve 6. The bearing journal 3 of the flap 1 is mounted in the second side wall, which is arranged parallel to the side wall 9, of the duct, so that the pivoting movement of the flap can take place in order to control the air flow passing through the duct.

Figure 2:
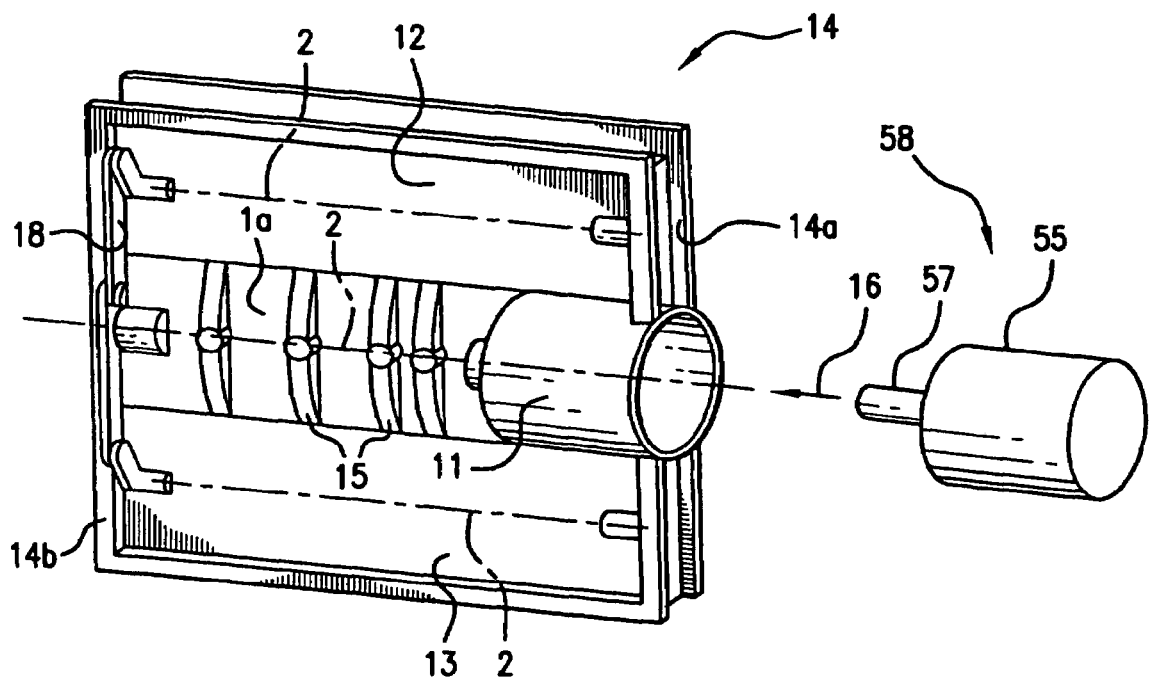
FIG. 2 is a perspective view of a control device with a driven flap, in which a plug-in guide similar to that shown in FIG. 1, is provided.

FIG. 2 shows a configuration which is very similar to the embodiment shown in FIG. 1, but in this case the flap 1a which is provided with the drive does not have a recess for the receiving pocket 11 for the drive element, but rather is shorter, by the length dimension of the sleeve-like receiving pocket 11, than the two adjoining flaps 12 and 13. The three flaps 1a, 12 and 13 are mounted in a common installation frame 14 on opposite frame limbs 14a and 14b, in each case by means of bearing journals which are aligned with their pivot axes 2.

In the case of the middle, shorter flap 1a, which incidentally is also provided with reinforcing ribs 15 which run transversely to the pivot axis 2, the output shaft of the drive element, which can be pushed into the sleeve 11 in the direction of the arrow 16, i.e., into the outwardly open side, is responsible for providing the bearing on the side of the frame limb 14a. In the process, this output shaft penetrates through the passage bore 17 in the sleeve 11.

The driven flap 1a is connected to the adjoining flaps 12 and 13 by means of a coupling rod 18. Therefore, rotational movement of the flap 1a through an angle of up to 90° is converted into a rotational movement of the flaps 12 and 13 in the same direction. The advantage of this embodiment shown in FIGS. 2 and 3, is that the entire installation frame 14 can be fitted with the flaps 1a, 12 and 13 with the drive already accommodated in the sleeve 11.

Therefore, the installation frame 14 can be installed as a complete assembly in a flow duct (not shown in more detail), so that the latter is provided with a control device for the quantity of air flowing through it. Accordingly, there is no need for the drive motor to be separately fitted to the duct per se.

Figure 3:
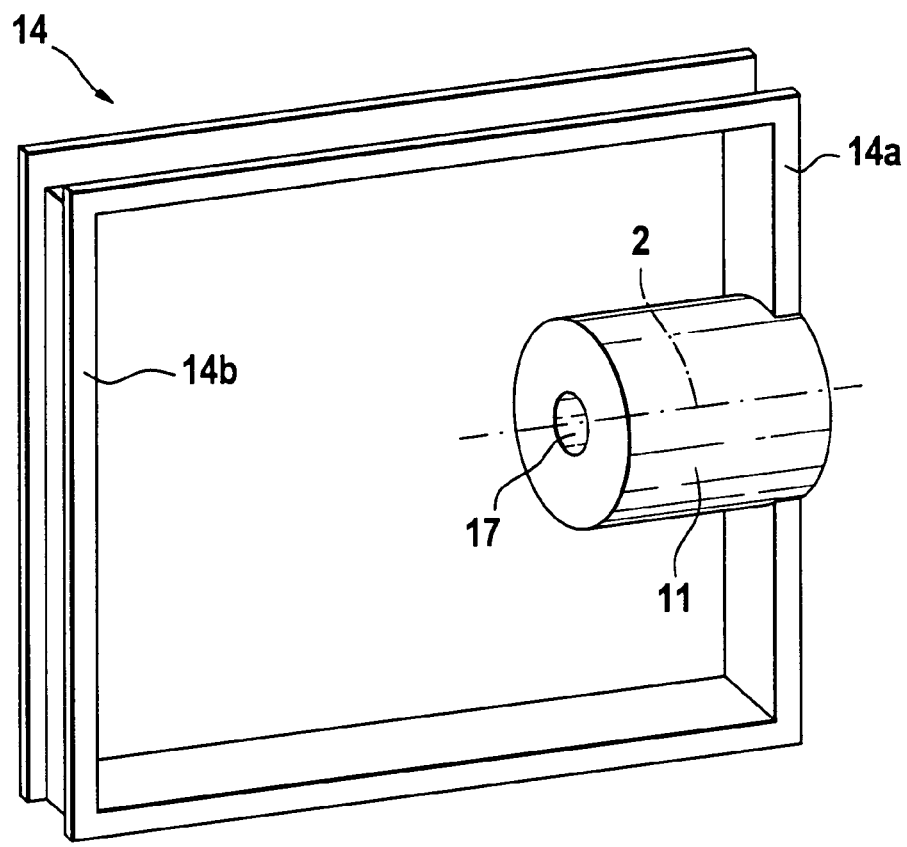
FIG. 3 illustrates the frame shown in FIG. 2.
Figure 4:
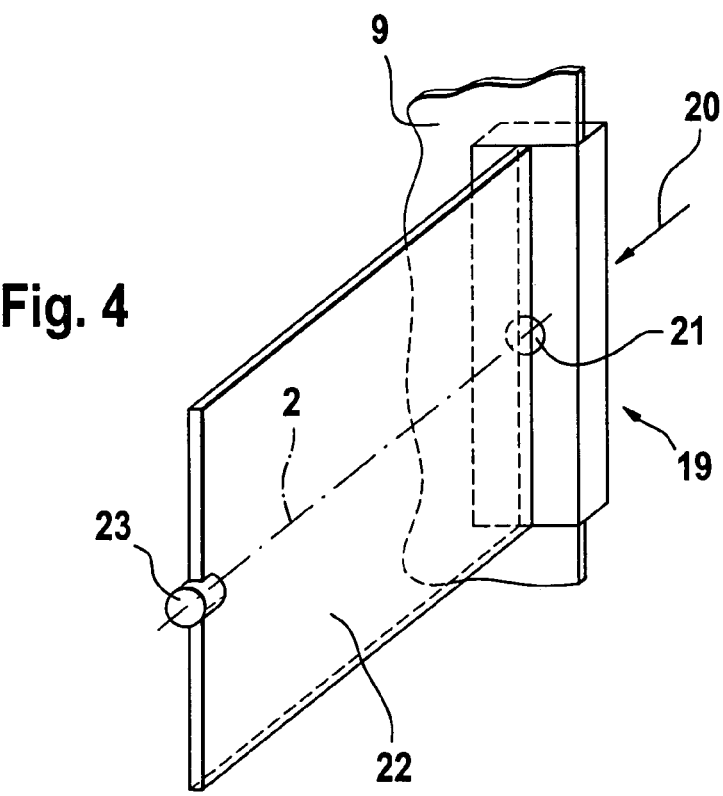
FIG. 4 shows a modified embodiment in which a rectangular drive with a rectangular plug-in guide is provided instead of a cylindrical drive element and a correspondingly designed plug-in guide, but wherein the plug-in direction likewise is coaxial with the pivot axis of the flap.

FIG. 4 shows another modification of the embodiments shown in FIGS. 1 to 3. In this case there is no cylindrical plug-in guide in the form of a sleeve 8 or 11, but rather a plug-in guide 19 is in the form of a rectangular shell which is open toward the outer side of the side wall 9 of the flow duct (not shown). A rectangular drive, which is adapted to the dimensions of the plug-in guide 19 and may also, for example, be provided with a reduction gear, can be inserted into the rectangular shell. The output shaft of this drive, as in the exemplary embodiments outlined above, penetrates through a passage opening 21 and is directly connected in a rotationally fixed manner to the flap 22. By means of the bearing journal 23 which lies on the pivot axis 2, flap 22 is mounted on the duct wall (not shown) which lies opposite the wall 9.

FIG. 5 shows a modified exemplary embodiment for the drive of a pivot flap 24. In this embodiment, the flap 24, which can be pivoted about the axis 2, is in this case pivoted from a drive unit 25 which has been pushed into and held in a plug-in guide 27 on the inner side of the duct wall 9, not in the direction of the pivot axis 2, but rather transversely to this direction, as indicated by the arrow 26. In this case too, the output shaft is responsible for bearing and driving of the flap 24, which is mounted pivotably in a duct wall 9a on the opposite side from the duct wall 9.

In order to permit free movement with respect to the drive element 25 arranged on one of its end sides, the flap 24 has a cutout 28 which—starting from a longitudinal side— extends beyond the pivot axis 2 to such an extent that there is no possibility of contact with the drive element 25 during a pivoting movement.

For the purposes of installation, in this embodiment it is possible for the drive element 25 to be pushed into the plug-in guide 27 in a position of the flap 24 which is pivoted through 90° with respect to the illustration in FIG. 5. This is because in this case the plug-in guide 27 is open at the top. The receptacle for the output shaft of the drive element 25 on the pivoting flap 24, i.e., on the bearing arrangement 29, may be designed in such a way that it is possible for the end of the output shaft to be introduced transversely with respect to the pivot axis. A latching operation, for example, secures the output shaft and pivoting flap 24 transversely with respect to the pivot axis 2.

FIGS. 6 and 7 show an embodiment in which the drive 30 extends over the entire width b of the flap 31, which is therefore spaced apart from the wall 9 of the air-guide duct (not shown in more detail) by the thickness a of the drive 30. In this construction, as shown in FIG. 6, the drive 30 may be equipped with a reduction gear 32. The statements which have already been made in connection with the exemplary embodiment shown in FIG. 5 also apply with regard to the receptacle for the output shaft (not shown in more detail) of the drive 30 in the connection piece 29 of the flap 31.

FIG. 7 shows that the plug-in guide 27', which substantially corresponds to the plug-in guide 27 shown in FIG. 5, may be designed as a simple plug-in pocket which is open on one side.

FIGS. 8 and 9 describe a modified exemplary embodiment, in that these figures show a drive 33 which approximately corresponds to the drive 25 shown in FIG. 5. However, in this arrangement the housing has grooves 34 on both sides thereof which form part of a dovetail-like design and which serve to receive guide strips 45 which are part of a plug-in guide on the channel wall 9 depicted in FIG. 10.

Assembly otherwise takes place as has already been described in connection with FIG. 5. In this case too, the flap 24, which may correspond to that shown in FIG. 5, has the recess 28, in order not to come into contact with the drive 33 during the pivoting movement. In this exemplary embodiment, the housing of the drive 33 is provided with a rounding 35 on the corner. This enables the edge 28a of the recess 28 to pivot past the housing during the pivoting movement of the flap 24 in the direction of the arrow 36. The rounding is therefore provided with a radius r which corresponds to the distance of the edge 28a from the pivot axis 2.

FIG. 11 shows a receiving guide 38 which encompasses the plug-in housing of a drive element 37 on the side which faces toward the flap (not shown). The housing of the drive 37 has a shoulder 39 which, to provide precise guidance, engages through a passage slot in the plug-in guide 38.

Figure 12:
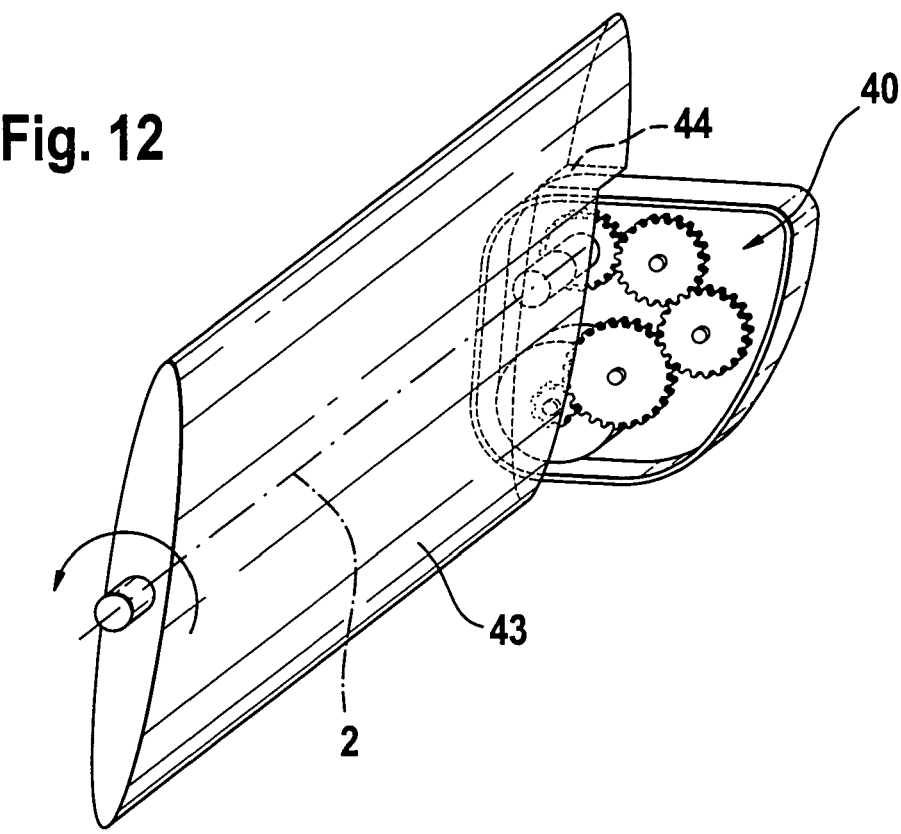
FIG. 12 is a perspective view of a drive element with a transmission orienting the flap in the first position.
Figure 13:
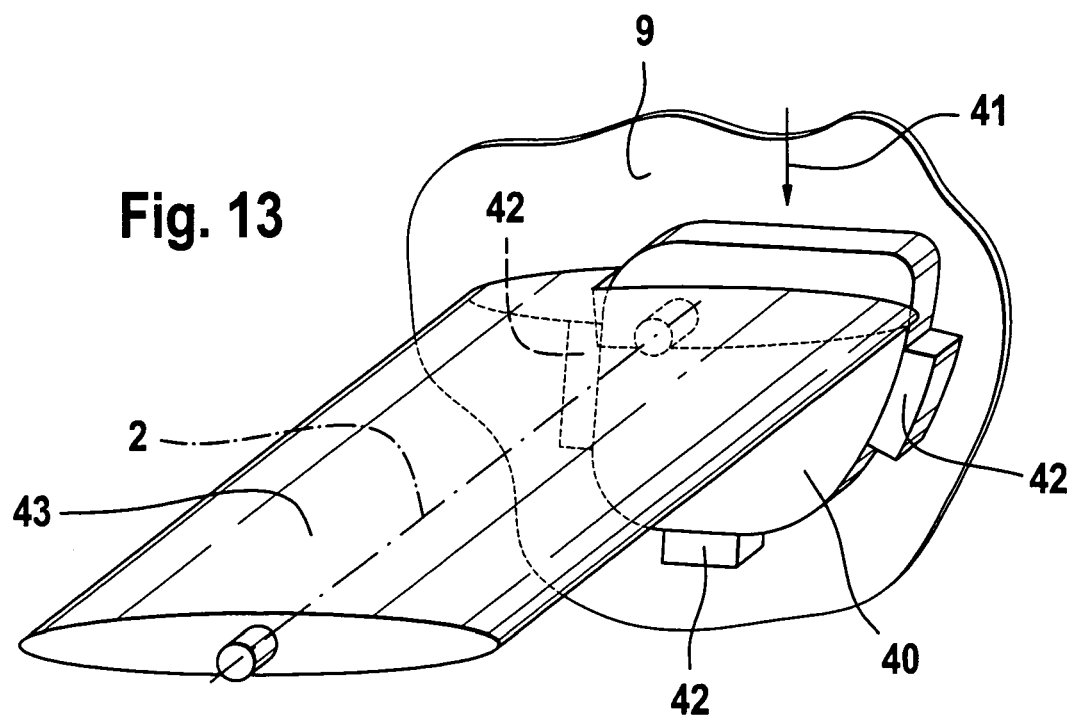
FIG. 13 is a view similar to that show in FIG. 12 showing the flap moved to a second flap orientation.
Figure 14:
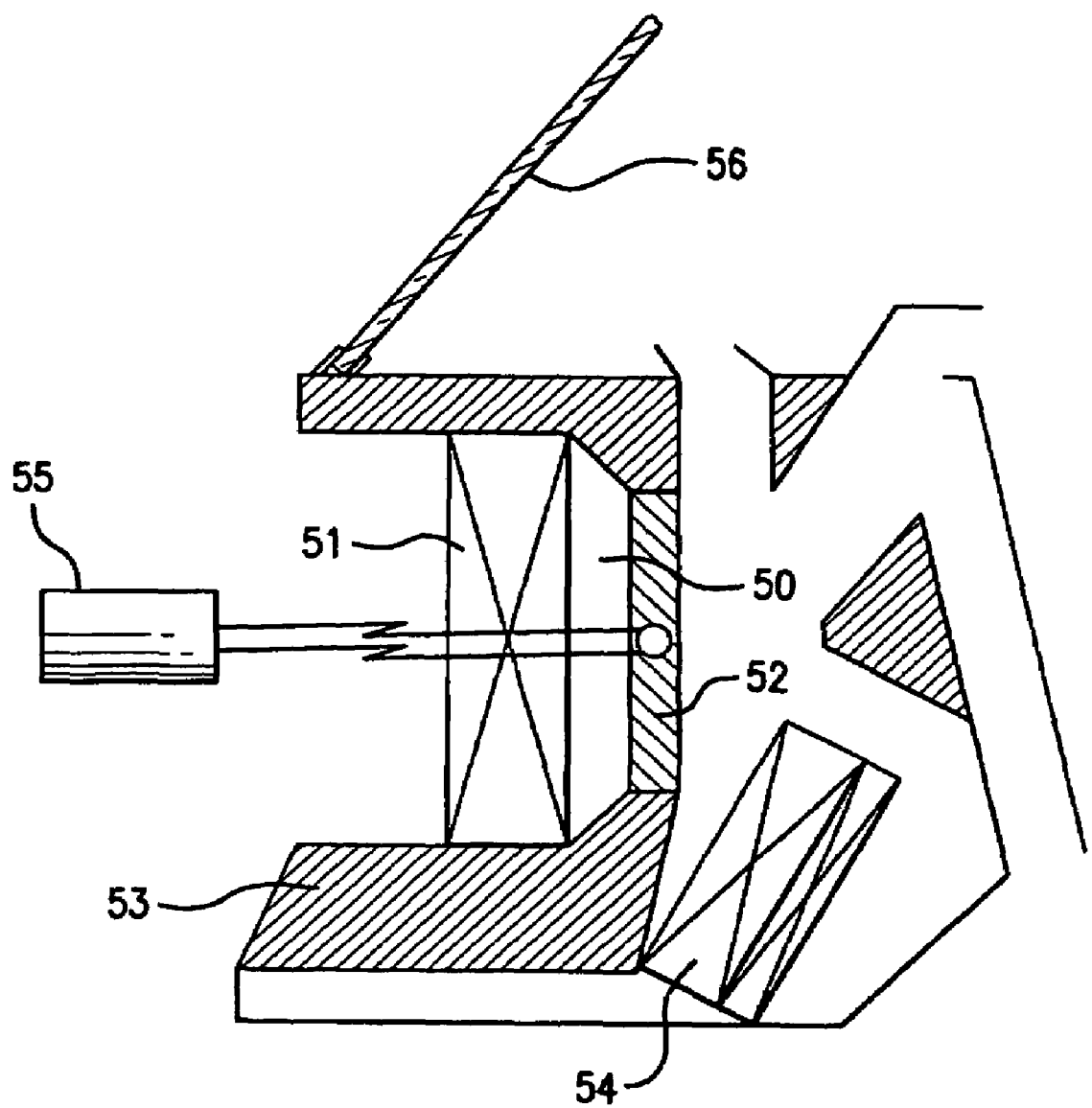
FIG. 14 is a view showing a motor vehicle comprising a flap and drive element.

FIGS. 12 and 13 show an embodiment with a drive 40 which can be pushed in the direction of the arrow 41, into a plug-in guide, which is formed by a plurality of projections 42. This drive 40 includes a reduction gear which is formed in a space-saving manner in the direction of the pivot axis 2.

In this case too, the flap 43 is provided with a cutout which allows a rotational movement with respect to the housing of the drive 40. Here again the edge 44 of the cutout pivots past a rounded housing edge which corresponds to the pivoting movement.

The disclosure of German Patent Application No. 100 24 692.3, filed May 18, 2000, is hereby incorporated by reference in its entirety. Also incorporated by reference is the disclosure of U.S. Pat. No. 5,878,806, which illustrates an automotive air-conditioning system into which the air flow control device according to the invention can be incorporated and which includes an illustrative embodiment in which an electric motor is used to alternately open and close air flow channels in a heating and/or air-conditioning system.

The foregoing embodiments have been shown and described for illustrative purposes only and are not intended to limit the scope of the invention which is defined by the claims. The invention includes all obvious modifications of the embodiments described above.

What is claimed is:

1. A device for gas flow control adapted for disposition in a duct of a motor-vehicle heating or air-conditioning system, comprising:
   a flap adapted to be pivotably supported between side walls of the duct for rotation about a pivot axis;
   a drive element comprising a drive motor having an output shaft adapted for operative connection to said flap; and
   a receiving pocket configured for insertion of the drive element, including the drive motor, said receiving pocket being provided in fixed relation to one of the side walls, and oriented and dimensioned such that the output shaft of the drive element is in engagement with the flap after insertion of the drive element into said receiving pocket, wherein said receiving pocket projects into the duct and wherein the drive motor is at least partially disposed in the receiving pocket
   wherein the drive motor comprises an electric motor.

2. A device as claimed in claim 1, further comprising a frame which is adapted to be installed in the duct and in which said receiving pocket is formed.

3. A device as claimed in claim 1, further comprising a second flap and a linkage interconnecting the first said flap with the second flap to establish a drive connection therebetween.

4. A device as claimed in claim 1, wherein the receiving pocket has a passage for the output shaft of the drive element.

5. A device as claimed in claim 4, wherein the receiving pocket is cylindrical and wherein said passage is a coaxial bore for the output shaft of the drive element to pass through.

6. A device as claimed in claim 1, wherein the receiving pocket comprises a plug-in guide, the plug-in guide extending coaxially with respect to the pivot axis of the flap.

7. A device as claimed in claim 6, wherein the receiving pocket has an opening to permit insertion of the drive motor into the receiving pocket.

8. A device as claimed in claim 1, wherein the receiving pocket is fixed to a side wall of the duct.

9. A device as claimed in claim 1, wherein the receiving pocket comprises a plug-in guide which runs transversely to the pivot axis of the flap.

10. A device as claimed in claim 9, wherein the drive element has a rectangular shape.

11. A device as claimed in claim 10, wherein the drive element has at least one rounded corner.

12. A device as claimed in claim 9, wherein the drive element includes a reduction gear arrangement.

13. A device as claimed in claim 9, wherein the plug-in guide is defined by at least three spaced support elements.

14. A device as claimed in claim 9, wherein the drive element includes channels extending on opposing sides and the plug-in guide comprises guide rails that cooperate with said channels.

15. A device for gas flow control adapted for disposition in a duct of a motor-vehicle heating or air-conditioning system, comprising:
a flap adapted to be pivotably supported between side walls of the duct for rotation about a pivot axis;
a drive element comprising a drive motor having an output shaft adapted for operative connection to said flap; and
a receiving pocket configured for insertion of the drive element, including the drive motor, said receiving pocket being provided in fixed relation to one of the side walls, and oriented and dimensioned such that the output shaft of the drive element is in engagement with the flap after insertion of the drive element into said receiving pocket, wherein said receiving pocket projects into the duct and wherein the drive motor is at least partially disposed in the receiving pocket wherein the receiving pocket projects into the duct from the side wall, and wherein the flap includes a cutout to permit pivoting movement of the flap past the drive element.

16. A device for gas flow control which is adapted for disposition in a duct, comprising:
a flap pivotal about an axis;
a drive element comprising a drive motor having an output shaft; and
a receiving pocket into which the drive element, including the drive motor, can be slid, said receiving pocket being so sized and dimensioned that the receiving pocket projects into the duct, and so that the receiving pocket positions the drive element with respect to said flap so that at least one of a drive connection between the output shaft and said flap is established or the axis of rotation is located in said predetermined location, when the drive element is slid to a seated position in said receiving pocket;
wherein the drive motor is at least partially disposed in the receiving pocket; and
wherein the drive motor comprises an electric motor.

17. A device as claimed in claim 16, further comprising a frame which is adapted to be installed in the duct, said frame having said receiving pocket formed therein.

18. A device as claimed in claim 16, further comprising a frame which is adapted to be fittingly disposed in the duct, the frame supporting the receiving pocket in which the drive motor is disposed, the frame further supporting the flap and being so dimensioned as to cooperate with the flap to control air flow past the flap.

19. A motor vehicle air-conditioning system, comprising:
a housing defining an air flow duct;
an evaporator located in the housing;
a heater located in the housing; and
an air flow control device positioned in the air flow duct, wherein the air flow control device comprises
a flap adapted to be pivotably supported between side walls of the duct for rotation about a pivot axis;
a drive element comprising a drive motor having an output shaft adapted for operative connection to said flap; and
a receiving pocket configured for insertion of the drive element, including the drive motor, said receiving pocket being provided in fixed relation to one of the side walls, and oriented and dimensioned such that the output shaft of the drive element is in engagement with the flap after insertion of the drive element into said receiving pocket;
wherein the drive motor is at least partially disposed in the receiving pocket; and
wherein the drive motor comprises an electric motor.

20. A device for gas flow control adapted for disposition in a duct of a motor-vehicle heating or air-conditioning system, comprising:
a flap adapted to be pivotably supported between side walls of the duct for rotation about a pivot axis;
a drive element comprising a drive motor having an output shaft adapted for operative connection to said flap; and
a receiving pocket configured for insertion of the drive element, including the drive motor, said receiving pocket being provided in fixed relation to one of the side walls, and oriented and dimensioned such that the output shaft of the drive element is in engagement with the flap after insertion of the drive element into said receiving pocket, wherein said receiving pocket projects into the duct and wherein the drive motor is at least partially disposed in the receiving pocket wherein said flap has a recess in which the receiving pocket is received.

21. An automobile comprising a device for gas flow control adapted for disposition in a duct of a heating or air-conditioning system of the automobile, comprising:
a flap adapted to be pivotably supported between side walls of the duct for rotation about a pivot axis;
a drive element comprising a drive motor having an output shaft adapted for operative connection to said flap; and
a receiving pocket configured for insertion of the drive element, including the drive motor, said receiving pocket being provided in fixed relation to one of the side walls, and oriented and dimensioned such that the output shaft of the drive element is in engagement with the flap after insertion of the drive element into said receiving pocket, wherein said receiving pocket projects into the duct and wherein the drive motor is at least partially disposed in the receiving pocket.

22. An automobile comprising an automotive air-conditioning system which comprises:
a housing defining an air flow duct;
an evaporator located in the housing;
a heater located in the housing; and
an air flow control device positioned in the air flow duct, wherein the air flow control device comprises
a flap adapted to be pivotably supported between side walls of the duct for rotation about a pivot axis;
a drive element comprising a drive motor having an output shaft adapted for operative connection to said flap; and
a receiving pocket configured for insertion of the drive element, including the drive motor, said receiving pocket being provided in fixed relation to one of the side walls, and oriented and dimensioned such that the output shaft of the drive element is in engagement with the flap after insertion of the drive element into said receiving pocket;
wherein the drive motor is at least partially disposed in the receiving pocket.

* * * * *